UNITED STATES PATENT OFFICE.

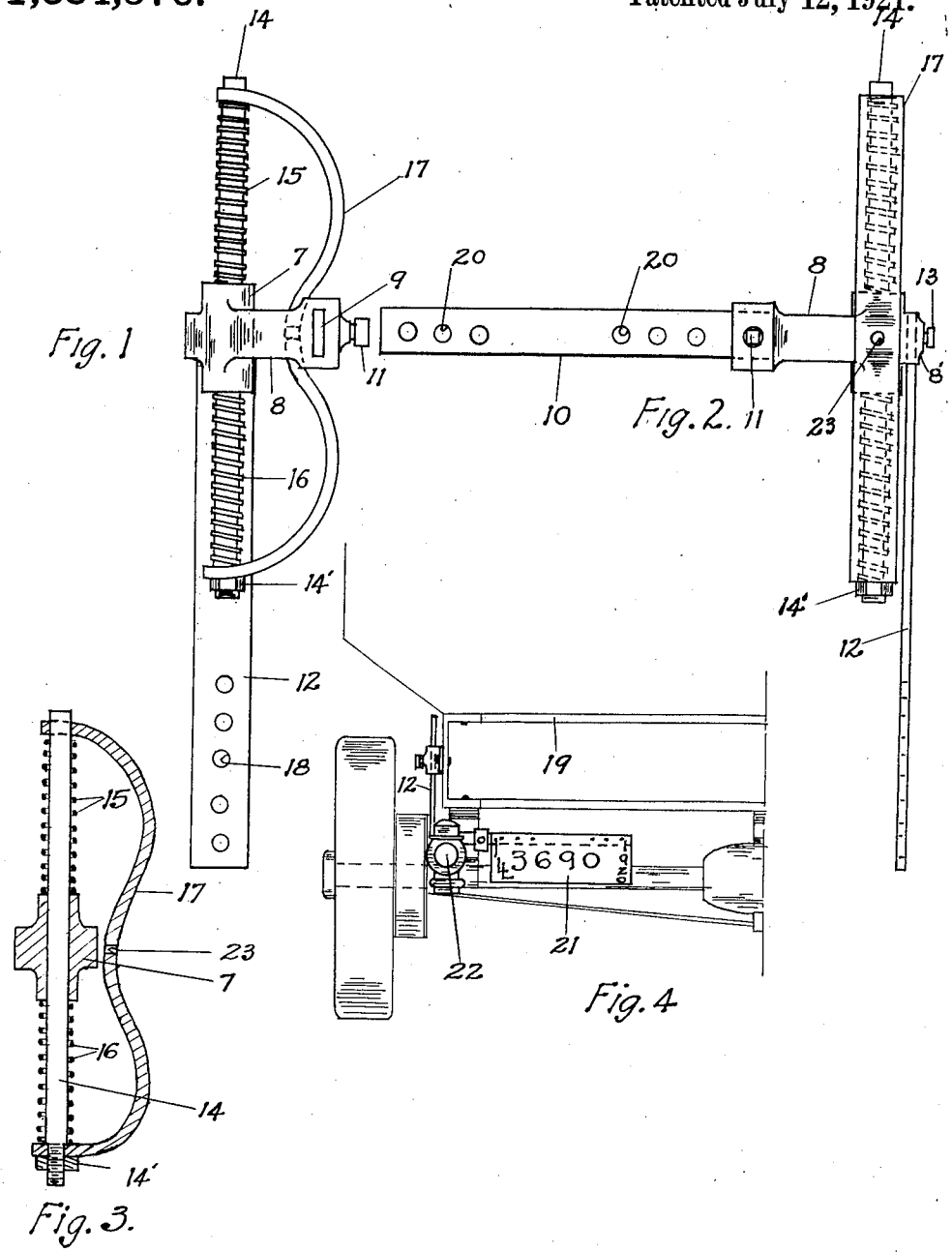

CHARLES SUHR, OF CHICAGO, ILLINOIS.

VEHICLE ATTACHMENT.

1,384,576.  Specification of Letters Patent.  Patented July 12, 1921.

Application filed March 13, 1920. Serial No. 365,631.

*To all whom it may concern:*

Be it known that I, CHARLES SUHR, a citizen of the United States, and a resident of the city of Chicago, county of Cook, and State of Illinois, have invented certain new and useful Improvements in Vehicle Attachments, of which the following is a specification.

My invention relates to new and useful improvements in vehicle attachments, and has for its object the provision of shock-absorbing means for attaching a light or license plate to a vehicle.

Other objects will appear hereinafter.

The invention consists in the combinations and arrangements of parts hereinafter described and claimed.

The invention will be best understood by reference to the accompanying drawings forming a part of this specification, and in which—

Figure 1, is a side elevational view of the invention,

Fig. 2, a rear elevational view of the invention,

Fig. 3, a sectional view of the invention, and

Fig. 4, a rear elevational view showing the invention applied to a vehicle.

The preferred form of construction comprises a hub 7 extending outwardly from which is an arm or bracket 8 provided with a socket bearing portion 9. The hub 7 is provided with a second arm 8' which extends at an angle to the arm or bracket 8 and is similarly formed. A metallic bar 10 is provided, which slidably engages in the socket 9, and a set screw 11 is provided to secure the bar 10 in fixed relation in the socket. An arm 12 is similarly provided to operate in the socket formed in the arm 8' which extends at an angle to the arm 8, said arms 12 extending parallel to the hub and at a right angle to arm 8. A set screw 13 is provided for the purpose of locking the arm 12 in the socket. Projecting through the hub 7 is a post 14, which is slidably mounted in the hub 7. A spiral spring 15 is positioned upon the post 14 at one side of the hub, and a spiral spring 16 is positioned upon the post 14 at the opposite side. A yoke 17 is provided, which has apertures formed at each end through which the member 14 projects. A nut 14' serves to retain the yoke 17 in position upon the member 14. The assembling of the yoke 17 upon the stem or post 14 is such that the member 14 may be slid in the hub 7 in either direction, the spiral springs 15 and 16 offering resistance to this slidable movement. A vehicle light 22 may be attached to the member 17, centrally thereof, by a suitable bolt projected through an opening 23 provided in the yoke. The plate 12 which is secured in one of the socket bearing arms is provided with apertures 18, by means of which the plate may be attached, by the use of suitable bolts, to the rear of a vehicle. The arm or bar 10 is also provided with perforations 20 through which bolts may be projected for securing the member 10 to the rear of a vehicle 19, or for securing a license plate 21 upon the member 10.

The invention is designed primarily for use upon the rear of automobiles, and especially the larger trucks. It has been learned from experience that the tail light secured to automobiles, and especially larger trucks, almost invariably becomes damaged and loosened, due to the natural jar of the vehicle passing over the roads. In order to relieve the tail light from this jar, I have provided a means of mounting the same upon the vehicle whereby the shocks are absorbed and the tail light mounting proper relieved therefrom. From the description of the device as already given, it is apparent that when the arm 10 or 12 is mounted upon the vehicle, and a shock transmitted thereto, the springs 15 and 16 will serve to absorb the shock so that the same is not transmitted to the yoke, and thereby to the tail light. It is also to be noted that because of the mounting of the members 10 and 12 in the sockets, the position of the tail light may be adjusted, as well as the position of the license plate.

Having described my invention, what I claim as new and desire to secure by Letters Patent is:—

1. A device of the class described, comprising a supporting bracket; a hub on said bracket; a stem projecting vertically from opposite sides of said hub and slidable therein; a member firmly mounted on the ends of said stem for attaching a lamp thereto; and means for retaining said lamp and member in constant relation to said hub, substantially as described.

2. A lamp support comprising a hub; an arm on said hub for rigidly mounting the same; a stem mounted for right line reciprocation in said hub; a yoke mounted adjacent the ends of said stem, the center of said yoke being attachable to a lamp; and resilient means mounted on said stem for retaining said yoke in constant vertical relation to said hub, substantially as described.

3. A lamp support comprising a hub; an arm extending parallel with said hub for mounting said support; a supporting arm on said hub extending at right angles to said first arm; a stem mounted for right line reciprocation in said hub; a yoke mounted on said stem; and resilient means for retaining said yoke in constant vertical relation to said hub, substantially as described.

4. A lamp support comprising a hub; a supporting arm on said hub for rigidly mounting the same; a stem mounted for right line reciprocation in said hub; a yoke rigidly mounted on the ends of said stem, the center of said yoke being attachable to a lamp; and resilient means for retaining said yoke in constant vertical relation to said hub, substantially as described.

In testimony whereof I have signed my name to this specification in the presence of two subscribing witnesses.

CHARLES SUHR.

Witnesses:
B. G. RICHARDS,
ROSE K. TRIB.